(12) United States Patent
Frohne et al.

(10) Patent No.: US 8,291,940 B2
(45) Date of Patent: Oct. 23, 2012

(54) FLEXIBLE CONDUIT PIPE

(75) Inventors: Christian Frohne, Hannover (DE);
Marc Baldermann, Binnen (DE);
Stephan Lange, Wedemark (DE)

(73) Assignee: Nexans, Paris (FR)

( * ) Notice: Subject to any disclaimer, the term of this patent is extended or adjusted under 35 U.S.C. 154(b) by 371 days.

(21) Appl. No.: 12/501,711

(22) Filed: Jul. 13, 2009

(65) Prior Publication Data
US 2010/0108169 A1     May 6, 2010

(30) Foreign Application Priority Data
Jul. 17, 2008    (EP) .................................... 08290698

(51) Int. Cl.
*F16L 11/15*      (2006.01)

(52) U.S. Cl. ......... 138/112; 138/114; 138/121; 138/148

(58) Field of Classification Search .............. 138/112, 138/114, 121, 148
See application file for complete search history.

(56) References Cited

U.S. PATENT DOCUMENTS

| | | | | |
|---|---|---|---|---|
| 2,914,090 A * | 11/1959 | Isenberg | ...................... | 138/113 |
| 3,530,680 A * | 9/1970 | Gardner, Jr. | .................. | 405/169 |
| 3,789,129 A * | 1/1974 | Ditscheid | ........................ | 174/28 |
| 4,056,679 A * | 11/1977 | Brandt et al. | ................... | 174/13 |
| 4,095,041 A * | 6/1978 | Netzel et al. | ..................... | 174/28 |
| 4,122,298 A * | 10/1978 | Brandt | .............................. | 174/28 |
| 4,160,119 A * | 7/1979 | Artbauer | .......................... | 174/28 |
| 4,263,476 A * | 4/1981 | Netzel | ............................. | 174/156 |
| 4,487,660 A * | 12/1984 | Netzel et al. | ..................... | 174/28 |
| 4,607,665 A * | 8/1986 | Williams | ....................... | 138/148 |
| 5,786,054 A * | 7/1998 | Platusich et al. | ............ | 428/36.91 |
| 5,803,127 A * | 9/1998 | Rains | .............................. | 138/113 |
| 6,186,181 B1 | 2/2001 | Schippl | | |
| 6,883,548 B2 * | 4/2005 | Schippl | ......................... | 138/112 |
| 6,896,004 B1 * | 5/2005 | Witzel | ........................... | 138/112 |
| 2004/0216795 A1 * | 11/2004 | Schippl et al. | ................ | 138/112 |

* cited by examiner

*Primary Examiner* — James Hook
(74) *Attorney, Agent, or Firm* — Sofer & Haroun, LLP

(57) ABSTRACT

A flexible conduit pipe for transporting fluids is specified, which consists of two corrugated metallic tubes, an inner tube (1) and an outer tube (2), which are arranged concentrically to one another and are separated from one another by an encircling annular space in which a spacing means is arranged. The spacing means consists of a plurality of rings (4,5) which bear with a basic body (6) against inner tube (1) and outer tube (2) and are arranged at an axial distance from one another in the annular space (3). The rings (4,5) have on their inner circumferential surface a rib (7) which extends in the circumferential direction, corresponds to the corrugation of the inner tube (1) and engages in a respective corrugation trough of the inner tube (1). At least three projections (8) are provided at least on one part of the rings (4) on their basic body (6), which projections (8) are offset from one another in the circumferential direction, protrude radially outwards and engage in the corrugation of the outer tube (2).

5 Claims, 1 Drawing Sheet

FLEXIBLE CONDUIT PIPE

RELATED APPLICATION

This application claims the benefit of priority from European Patent Application No. 08290698.3, filed on Jul. 17, 2008, the entirety of which is incorporated by reference.

BACKGROUND

1. Field of the Invention

The invention relates to a flexible conduit pipe for transporting fluids, which consists of two corrugated metallic tubes, an inner tube and an outer tube, which are arranged concentrically to one another and are separated from one another by an encircling annular space in which a spacing means is arranged (EP 0 952 382 B1).

2. Description of Related Art

Such conduit pipes are used for transporting a wide variety of fluids. These may normally be temperature-adjusted, heated or cooled liquids and gases. A special field of application is, for example, the transport of liquid gases, such as, for example, nitrogen and helium and also in particular methane. For this application, the conduit pipes must also have effective thermal insulation so that temperatures of less than −160° C., at which the gases are liquid, can be maintained. To this end, as little heat transfer as possible between outer tube and inner tube is also necessary, which also applies to the transport of heated fluids. The respective fluid enters the inner tube of such a conduit pipe as a rule at high speed, such that said inner tube—due to the corrugation—is "carried along" in the direction of flow of the fluid and is compressed at the end of the transmission section. The displacement of the inner tube in the outer tube caused by this leads to undesirable deformation of the conduit pipe overall.

In the flexible conduit pipe according to EP 0 952 382 B1 mentioned at the beginning, the spacing means consists of two strands of glass-fibre-reinforced plastic which are wound onto the inner pipe in opposite directions. In addition, nonwoven material is arranged as insulating material in the annular space, and a vacuum of between $10^{-1}$ mbar and $10^{-3}$ mbar prevails in the latter. This conduit pipe has proved successful in practice. Here, too, however, it is possible for the inner tube to be displaced in the outer tube despite the nonwoven material which virtually completely fills the annular space.

OBJECTS AND SUMMARY

The object of the invention is to design the conduit pipe described at the beginning in such a way that the mutual position of inner tube and outer tube is firmly retained in the long run.

This object is achieved according to the invention in that
 the spacing means consists of a plurality of rings which bear with a basic body against inner tube and outer tube and are arranged at an axial distance from one another in the annular space,
 the rings have on their inner circumferential surface a rib which extends in the circumferential direction, corresponds to the corrugation of the inner tube and engages in a respective corrugation trough of the inner tube, and
 at least three projections are provided at least on one part of the rings on their basic body, which projections are offset from one another in the circumferential direction, protrude radially outwards and engage in the corrugation of the outer tube.

During the production of the conduit pipe, the rings for the spacing means of this conduit pipe can be attached to the inner tube in the same processing step as the manufacture of said conduit pipe. They are at least partly designed in such a way that they engage or project both into the corrugation of the inner tube and, after the outer pipe is attached, into the corrugation of the latter. Each of the rings provided with rib and projections can thus be regarded as a fixed point or fixed clamp between inner tube and outer tube. Due to the rings, a relative movement between the two tubes is ruled out overall, even when the fluid to be transported enters the inner pipe at high speed. The construction of the conduit pipe is therefore firmly retained in the long run.

In order not to impair the good bendability of the conduit pipe, only one part of the rings advantageously has the projections pointing outwards, which in the finished conduit pipe engage in the outer tube. The other rings have only the basic body bearing against inner tube and outer ptube and the rib engaging in the corrugation of the inner tube. As a result, these rings are fixed to the inner tube but can slide on the outer tube. For the stability of the conduit pipe, it suffices if, for example, every third to eighth ring has projections pointing outwards. If it is every third ring, then two respective rings without projections pointing outwards lie in between. However, all the rings or every second ring could also have projections pointing outwards.

In addition, the rings arranged at an axial distance from one another in the spacing means require little material. The heat transfer between the two tubes is therefore increased only marginally by the rings, especially since the latter engage in the outer tube only with projections offset from one another in the circumferential direction or do not engage in said outer tube at all. The heat transfer between inner tube and outer tube can then be further reduced if the rib of the rings is interrupted at least once in the circumferential direction.

BRIEF DESCRIPTION OF THE DRAWINGS

An exemplary embodiment of the subject matter of the invention is shown in the drawings, in which.

DETAILED DESCRIPTION

Figure 1:
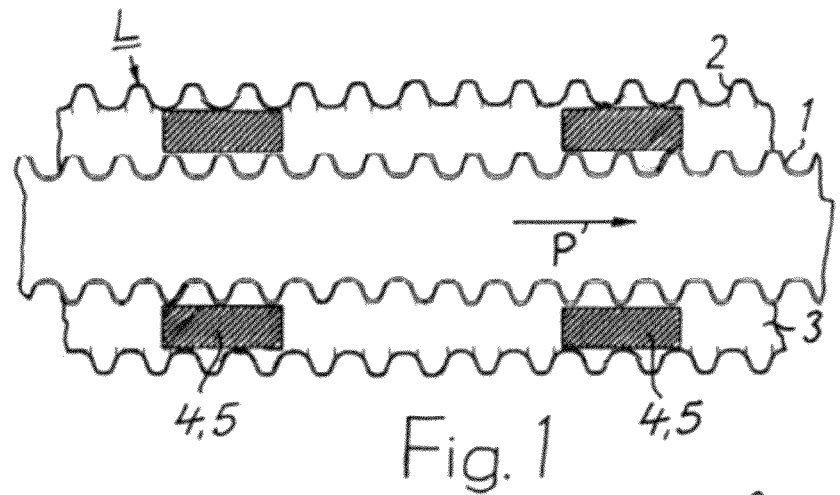
FIG. 1 schematically shows a sectional view of a section of a conduit pipe according to the invention.

Shown in FIG. 1 is a sectional view of a section of a conduit pipe L which consists of two metallic tubes arranged concentrically to one another—an inner tube 1 and an outer tube 2. Located between the two tubes is an encircling annular space 3, in which a spacing means consisting of rings 4 and 5 is attached. The rings 4 and 5 bear against both the inner tube 1 and the outer tube 2 and hold the inner tube concentrically to the outer tube.

The two tubes are corrugated transversely to their longitudinal direction and are made, for example, of steel, preferably of high-grade steel. They are each advantageously formed continuously from a steel strip to make a slit pipe having an axially running slit which is welded in a continuous pass. The tube, which is in each case closed as a result, is then corrugated. In the process, the corrugation can run in an annular or helical manner. The tubes become bendable due to the corrugation, such that conduit pipe L can be wound onto a reel for transport and can be unwound from the same for laying.

The rings 4 and 5 are made, for example, of glass-fibre-reinforced plastic or of polytetrafluoroethylene. The material to be used for the rings 4 and 5 substantially depends on the temperature of the fluid to be transported and on the temperature of the environment in which the conduit pipe L is laid or is to be laid. It is also possible to produce the rings 4 and 5 from two or more different materials which are superimposed radially in one piece.

Figure 2:
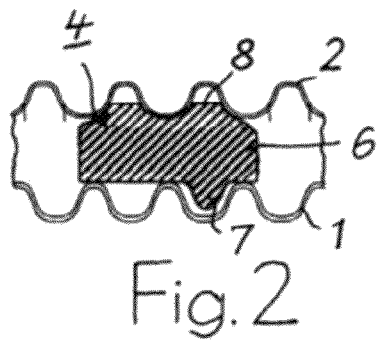
FIGS. 2 and 3 show sections through rings which can be used in the conduit pipe according to FIG. 1, in two different embodiments in an enlarged illustration.

In the fitted state, the rings 4 engage both in the corrugation of the inner tube 1 and in the corrugation of the outer tube 2, as can be seen from FIG. 2 in an enlarged illustration. Each ring 4 has a basic body 6, a rib 7 and at least three projections 8 protruding radially outwards. The height of the basic body 6 corresponds to the radial height of the annular space 3, such that inner tube 1 and outer tube 2 are held concentrically to one another. The rib 7 is provided on the inner circumferential surface of the ring 4 or of the basic body 6 and is connected in one piece to the same. It is matched to the corrugation of the inner tube 1 in such a way that it fits in one of the corrugation troughs of the same. The projections 8 are likewise connected in one piece to the ring 4 or the basic body 6. They protrude outwards from the outer circumferential surface of the ring 4. The projections 8 are offset from one another in the circumferential direction of the ring 4, preferably at a uniform distance apart in each case. More than three projections 8 may also be provided on the basic body 6 of the ring 4.

Figure 3:
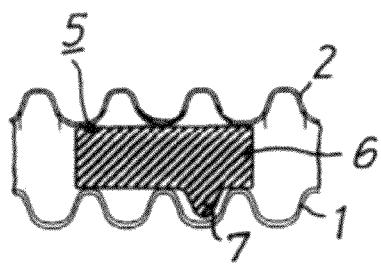

Rings 5, which according to FIG. 3 consist only of the basic body 6 and the rib 7, are provided in the conduit pipe L in addition to the rings 4. In the fitted position, the basic body 6 of the rings 5 bears against both the inner tube 1 and the outer tube 2, and the ribs 7 also engage in the corrugation troughs of the inner tube 1 in the case of the rings 5.

Figures 4, 5:
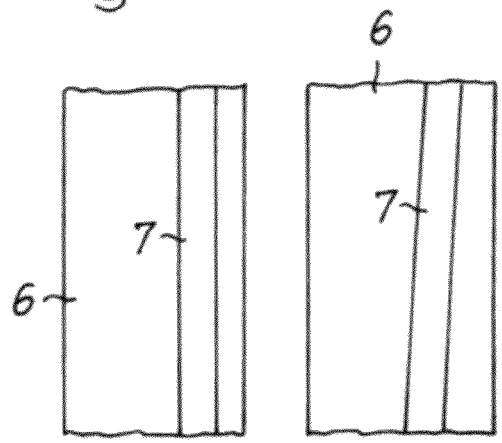
FIGS. 4 and 5 show the inner circumferential surface of the rings according to FIGS. 2 and 3 in two different embodiments.

According to FIG. 4, the rib 7 of the rings 4 and 5 can run in an annular manner. This is envisaged for an inner tube 1 provided with an annular corrugation. For a helically corrugated inner tube 1, the rib 7 runs helically. This is indicated in FIG. 5 by an oblique course of the rib 7. The rib 7 may in each case be present in an encircling manner over the entire inner circumferential surface of the basic body 6 of the rings 4 and 5. However, it may also be interrupted at least once in the circumferential direction.

Figure 6:
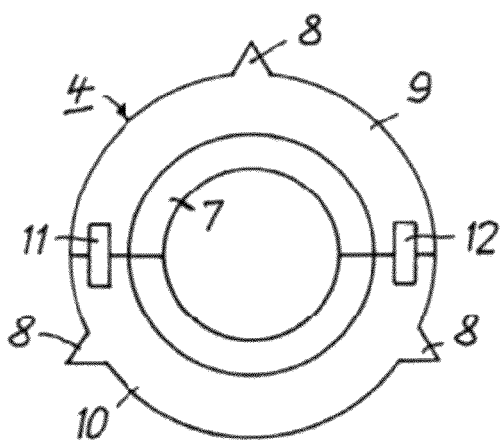
FIG. 6 shows a side view of a ring according to FIG. 2.

The rings 4 and 5 advantageously consist of two half-rings 9 and 10, which according to the illustration in FIG. 6 are held together at the parting locations by locking bars 11 and 12 which are preferably attached on both sides of the rings 4 and 5. They are advantageously designed as snap connections which are connected to one another without additional measures when fitting together the two ring halves 9 and 10. The two-piece configuration enables the rings 4 and 5 to be put onto the inner tube 1 in a very simple manner. To this end, the two half-rings 9 and 10 are placed against the inner tube 1 from two opposite sides and are connected to one another by means of the locking bars 11 and 12. Fastening elements other than the locking bars 11 and 12 may also be used, said fastening elements allowing the two half-rings 9 and 10 to be connected to one another as simply and as quickly as possible.

The conduit pipe L according to the invention is produced, for example, as follows:

The inner tube 1 can be formed from a metal strip by the technique described further above or can be moved continuously as a prefabricated tube in the direction of arrow P. During this movement, the rings 4 and 5 are put onto the inner tube 1 at predetermined axial distances apart and in a predetermined sequence. To this end, the two half-rings 9 and 10, as already mentioned, can each be put around the inner tube 1 from two opposite sides and can be locked together. The rib 7 of the rings 4 and 5 then projects into one of the respective corrugation troughs of the inner tube 1. In a preferred embodiment, the predetermined sequence provides for every third ring to be a ring 4 having projections 8, whereas the second and third rings are each rings 5 without projections pointing outwards.

Then, in the same processing step, likewise with continuous movement in the direction of arrow P, the outer tube 2 is formed around the rings 4 and 5 from a metal strip by the technique described further above. During the corrugating of the outer pipe 2, at least one corrugation trough of the same penetrates into the projections 8 of the rings 4, such that said projections 8 are pressed together at the corresponding points and, in the region of at least one adjacent corrugation crest, project into the latter. This can be seen from the illustration in FIG. 2. In this way, a fixed connection between inner tube 1 and outer tube 2 is produced by each of the rings 4. The inner tube 1 therefore cannot move axially relative to the outer tube 2. At the rings 5, the outer tube 2 in the finished conduit pipe L bears against the basic body 6 of said rings 5.

If need be, a protective covering of insulating material can be provided over the outer tube 2. Said protective covering can be made, for example, of polyvinylchloride or polyurethane.

The invention claimed is:

1. Flexible conduit pipe for transporting fluids comprising:
    two corrugated metallic tubes, an inner tube and an outer tube, which are arranged concentrically to one another and are separated from one another by an encircling annular space in which a spacing means is arranged, wherein
    the spacing means has a plurality of rings, each of which have a basic body that bears against both an outer surface of said inner tube and an inner surface of said outer tube, said rings being arranged at an axial distance from one another in the annular space,
    the rings have on their inner circumferential surface a rib which extends in the circumferential direction, corresponds to and engages a corrugation trough of the outer surface of said inner tube; and
    at least three projections are provided on at least one ring of said plurality of rings on its basic body, said projections offset from one another in the circumferential direction, protrude radially outwards and engage in, during said production of said corrugations of said outer tube, a corresponding corrugation trough on said inner surface of said outer tube,
    such that said pressing of said spacing means into said corrugations of said outer tube prevents relative axial movements between said inner tube and said outer tube of said flexible conduit pipe.

2. Conduit pipe according to claim 1, wherein every third to eighth ring has projections on its outer circumferential surface, whereas the rings lying in between have no projections pointing outwards.

3. Conduit pipe according to claim 1, wherein the rib of the rings is present all around in the circumferential direction and runs in an annular or helical manner.

4. Conduit pipe according to claim 1, wherein the rib of the rings is interrupted at least once in the circumferential direction and runs in an annular or helical manner.

5. Conduit pipe according to claim 1, wherein the rings each have two half-rings which are connected to one another in the fitted state.

* * * * *